United States Patent [19]

Paddock

[11] 4,440,825

[45] Apr. 3, 1984

[54] LAMINATE WITH SKIN BASED ON AES GRAFT COPOLYMER

[75] Inventor: Charles F. Paddock, Southbury, Conn.

[73] Assignee: Uniroyal, Inc., New York, N.Y.

[21] Appl. No.: 406,597

[22] Filed: Aug. 9, 1982

[51] Int. Cl.$^3$ .............................................. B32B 3/26
[52] U.S. Cl. ........................... 428/318.6; 428/318.8; 428/318.4; 428/521; 428/319.7; 525/70; 525/75
[58] Field of Search .................. 428/318.4, 308.4, 517, 428/520, 319.3, 319.7, 521, 522, 318.6, 318.8; 525/70, 75

[56] References Cited

U.S. PATENT DOCUMENTS 3,206,354 9/1965 Pooley .............................. 428/319.7
4,202,948 5/1980 Peascoe ................................ 525/70

Primary Examiner—George F. Lesmes
Assistant Examiner—E. Rollins Buffalow
Attorney, Agent, or Firm—James J. Long; Bert J. Lewen

[57] ABSTRACT

A laminate having at least two layers, one of which comprises an AES graft copolymer composition, the other layer being a rigid foamed plastic.

10 Claims, No Drawings

LAMINATE WITH SKIN BASED ON AES GRAFT COPOLYMER

This invention relates to a laminate having a skin based on "AES" graft copolymer, i.e., a graft copolymer of resin-forming monomers on an EPM or EPDM type rubber spine.

The invention is concerned particularly with a laminate having at least two layers, one of which comprises an AES graft copolymer composition, the other layer being a rigid layer of thermoplastic, usually a foamed or expanded layer, such as a layer of "ABS" (acrylonitrile-butadiene-styrene) graft copolymer composition, or a layer of foamed AES, foamed PVC (polyvinyl chloride), or the like, including thermoplastic blends such as a blend of styrene-acrylonitrile-maleic anhydride copolymer with polybutadiene.

In one form of the invention, the laminate has at least three layers, usually an inner core of rigid foamed plastic, and an outer layer or covering of AES graft copolymer composition on each side of the foamed core.

In the laminates of the invention the AES outer layer may be applied directly to the foamed plastic layer, or there may be an intermediate adhesion-promoting layer, such as a layer of solid ABS, interposed between the AES layer and the underlying rigid foam layer.

In a particularly valuable form, the invention is concerned with a five-layered laminate, in which the successive layers are as follows:

1. solid AES skin
2. solid ABS (or other thermoplastic resin) substrate
3. foamed ABS (or other rigid plastic foam) core
4. solid ABS (or other thermoplastic resin) substrate
5. solid AES skin.

It has previously been known to provide a thermoplastic sheet consisting of a foamed ABS core covered by solid ABS substrate layers which in turn are covered by outer skin layers. Such laminates are particularly useful for making thermoformed (e.g., vacuum formed) shaped articles of various kinds. The purpose of the outer skin layers is mainly to protect the laminate from adverse effects of exposure to the weather. The provision of an entirely satisfactory, economical skin layer material, that would have desirable hardness and that would be reprocessable (so that scrap material or rejects could be recycled readily), has been a particular problem. The following table traces the evolution of the chemical composition of the skin layers (as described for example in U.S. Pat. Nos. 3,070,817, Kohrn et al, Jan. 1, 1963, 3,041,220, Martin et al, June 26, 1962, 3,206,354, Pooley, Sept. 14, 1965):

| Skin | U.S. Pat. No. | Reprocessible | Cured | Hardness |
| --- | --- | --- | --- | --- |
| 1st commercial skin chlorosulfonated polyethylene-NBR blend | 3,070,817 | No | Yes | Too soft |
| 2nd commercial skin chlorosulfonated polyethylene-SAN-PVC-NBR blend | 3,041,220 | No | Yes | Too soft (harder than #1) |
| 3rd commercial skin NBR-PVC blend | 3,206,354 | No | Yes | Too soft (harder than #2) |
| AES skin | Present Invention | Yes | No | Satisfactory (Range of hardness available) |

The older skins (#1 through #3) all possessed one or more of the following disadvantages in regard to reprocessing:

1. crosslinked
2. heat sensitive
3. chemical incompatibility with ABS.

The advantages of reprocessing AES in ABS are as follows:

1. Since the continuous resin phase in ABS and AES are the same (SAN), the two polymers are compatible in all proportions.
2. AES is not crosslinked.
3. AES is even more heat stable than ABS.

In a series of experiments samples of AES made by emulsion polymerization, ranging in rubber content from 25 to 42%, were calendered and laminated to form:

1. AES-ABS two-layer laminates.
2. AES-ABS-ABS (Foam)-ABS-AES five-layer laminates.

Test results on these materials indicated good weatherability as measured by impact strength retention. The highest rubber level (42%) AES skin provided the highest impact strength after aging.

The AES is advantageously produced as described in U.S. Pat. No. 4,202,948, Peascoe, May 13, 1980. Particularly useful laminates can be made containing 23% EPDM in the AES layer; there is also utility in compositions that contain considerably more rubber (approximately 30–50%). Among the advantages in specific instances are improved impact strength retention during aging and improved processing behavior. The AES cap stock employed in the invention has an advantage over many other cap stocks in the ease with which the rubber level can be varied over a wide range.

Publications of interest include "Rovel (trademark) Weatherable High Impact Polymers" published by Uniroyal Chemical and Roofing/Sliding/Insulation magazine, page 12, October, 1980.

In one important aspect, the invention is accordingly directed to a five-layered, rigid, heat-formable laminated sheet material having a core sheet of rigid cellular acrylonitrile-butadiene-styrene material, a rigid sheet of solid acrylonitrile-butadiene-styrene material integrally united to each face of said core sheet, and an outer protective skin of flexible adherent material overlying each outer face of the laminate, wherein the said outer protective skin is an AES graft copolymer composition, the said AES comprising a graft copolymer of resin-forming material on EPM or EPDM rubber.

The improved laminate of the invention may be shaped at elevated temperatures, particularly with the aid of vacuum or other differential pressure, into useful articles of all sorts such as truck bodies or cabs, automotive hoods, trailer bodies, camping bodies, boat hulls, decks, luggage and the like, that are light in weight but are strong, impact-resistant, buoyant, and have other advantages.

A preferred laminate of the present invention may be described as comprising a relatively thick expanded or blown cellular core sheet made of gum plastic (rubber-resin composition) based on ABS (acrylonitrile-butadiene-styrene) polymeric material, each face of which is integrally united to a thinner substrate sheet of the gum plastic in a solid, unblown state (for optimum adhesion and compatibility between layers), such substrate in turn being covered on its outer face by an integrally united thin protective skin based on AES graft copolymer composition. The central core member and the sub-strate layers of gum plastic are adequately described in the U.S. Pat. Nos. 3,041,220 and 3,070,817 mentioned previously. Such gum plastic based on ABS material is rigid and contains a major proportion (51 to 90 parts by weight) of resinous component and a minor proportion (correspondingly 49 to 10 parts, per 100 parts of gum plastic polymers) of rubbery component. Such ABS material may be either a physical mixture of a separately prepared resin (styrene-acrylonitrile copolymer resin containing 50 to 90% by weight of styrene and correspondingly 50 to 10% acrylonitrile) with a separately prepared rubber (butadiene-acrylonitrile copolymer rubber containing 50-85% by weight of butadiene and correspondingly 50-15% acrylonitrile), or it may be based at least in part of so-called graft copolymer in which rubber and resin are at least partially chemically combined (graft copolymer made by copolymerizing resin-forming monomers such as styrene and acrylonitrile in a previously prepared rubber such as polybutadiene). Such graft copolymer may be combined with additional separately prepared styrene-acrylonitrile resin and/or butadiene acrylonitrile rubber to provide a desired over-all ratio of resinous component to rubbery component. Frequently the resulting ABS composition contains about 15-30% acrylonitrile, about 15-40% butadiene, and about 40-60% styrene, by weight, based on the entire ABS polymer as 100%. If desired the described polymers may be supplemented or replaced at least in part by equivalent polymers based for example on homologs or substitution products of the described monomers, e.g., alpha methyl styrene or dichlorostyrene in place of styrene, methacrylonitrile in place of acrylonitrile. Instead of basing the resinous portion of the gum plastic entirely on styrene-acrylonitrile resin, such resinous portion may be based on a mixture of styrene-acrylonitrile resin and a vinyl resin, such as a vinyl chloride resin, especially polyvinyl chloride or the like (in ratio of, for example, 10 parts of styrene-acrylonitrile resin to up to 10 parts of polyvinyl chloride) while preserving the previously described over-all ratio of resin to rubber. Usually it is advantageous to blend the polymers by mixing aqueous latices of the polymers and then coagulating the mixture, but the described blends may also be made by mill mixing the dry, solid polymers.

The manner in which the gum plastic materials comprising the central core member and intermediate substrate layers are compounded with suitable conventional compounding ingredients such as small amounts of plasticizer, antioxidant, stabilizer, and if desired vulcanizing ingredients such as sulfur and accelerator, pigments or fillers, and the like, is amply described in U.S. Pat. Nos. 3,041,220 and 3,070,817. In addition, as described in those patents, the composition for the core includes a blowing agent [e.g., dinitroso pentamethylene tetramine, azodicarbonamide, or p,p'-oxybis-(benzenesulfonyl hydrazine)] capable of decomposing at elevated temperature to evolve gas which causes the core member to become expanded or blown to a cellular condition. The intermediate substrate layers, which are solid, of course contain no blowing agent but may otherwise be compounded essentially similarly to the core composition.

Considering now the composition of the external protective skin layer applied over the outer surface of the intermediate solid substrate layers superimposed on the expanded core, such skin layer in accordance with the invention is comprised, as indicated, of AES graft copolymer, which is ordinarily based on a graft copolymer of resin-forming monomeric material (especially such monomers as vinyl aromatics, alkenoic nitriles, esters, or acids, or mixtures thereof, e.g., a mixture of styrene and acrylonitrile) on an olefin copolymer rubber spine, whether a saturated ethylene-propylene rubber (EPM) or an unsaturated terpolymer (EPDM) containing a suitable diene, especially a non-conjugated diene, as in rubbery terpolymers of ethylene, propylene, and ethylidene norbornene, hexadiene, or other conventional copolymerizable non-conjugated diene. In the preparation of such a graft copolymer, much of the resin-forming monomers become chemically grafted to the rubbery spine, but a certain amount of ungrated resin is also formed (i.e., grafting efficiency is not 100%). In a preferred practice, additional separately prepared resin is blended with the product of the graft polymerization step. Typically, separately prepared styrene-acrylonitrile resin (SAN) is blended with the product of graft polymerization of styrene and acrylonitrile on EPDM. However, it is also possible to make all of the resinous portion in situ during the graft polymerization. In either case the entire final SAN-EPDM product may be referred to as AES.

In preferred skin compositions of the invention, the EPDM content of the product of the graft copolymerization step is from 35 to 60, preferably 50% and the EPDM content of the AES after blending in separately prepared resin is 10 to 50%, preferably 23%.

The AES component of the blend of the invention is preferably prepared by blending two separate components, namely:

(A) a graft copolymer of styrene and acrylonitrile on EPDM rubber, particularly ethylene-propylene-5-ethylidene-2-norbornene terpolymer rubber; and (B) separately prepared styrene-acrylonitrile resin.

Examples of the graft copolymer component (A) and the separately prepared resin component (B) are described in more detail in U.S. Pat. No. 4,202,948, Peascoe, May 13, 1980. The preferred graft copolymer (A) is prepared by graft copolymerizing (a) styrene and acrylonitrile in weight ratio of 80/20 to 65/35 on (b) a rubbery terpolymer of ethylene, propylene and 5-ethylidene-2-norbornene in which the weight ratio of ethylene to propylene is within the range of from 80/20 to 20/80. The Mooney viscosity of the terpolymer rubber (b) is preferably from 40 to 80 ML-4 at 257° F. and the iodine number of the rubber (b) preferably is from 15 to 40. The amount of (a) acrylonitrile/styrene is about 50% based on the weight of (a) plus (b).

The preferred separately prepared resin (B) is a copolymer of styrene and acrylonitrile in weight ratio of 80/20 to 65/35 having an intrinsic viscosity in dimethylformamide at 30° C. of at least 0.4. The amount of resin (B) in the AES is sufficient to provide an over-all ratio of resin to rubber in the range of from 85/15 to 60/40.

In a particularly valuable form of the invention, an antioxidant is present during the AES graft copolymerization stage.

In preparing the AES it is especially important that the graft copolymer (A) and the SAN resin component (B) be sheared or masticated at elevated (fluxing) temperature, for example in a twin screw type of extruder-blender.

It will be understood that whether the laminate of the invention contains only two layers, or more than two layers, it may be assembled by any suitable conventional laminating method, for example by calendering or extruding separate layers which are thereafter superimposed and pressed together at elevated temperature. The lamination may be carried out continuously, or batchwise.

The following example will serve to illustrate the practice of the invention in more detail.

EXAMPLE

To prepare the skin stock, an AES graft copolymer may be prepared as described in U.S. Pat. No. 4,202,948 (Example 2) referred to above, as follows:

A 10-gallon autoclave equipped with a thermometer and a motor stirrer is charged with 413 parts by weight of water, 0.27 parts by weight of Methocel K-100 (trademark; hydroxypropyl methylcellulose produced by Dow Chemical Company) 100 parts by weight of ethylene/propylene-5-ethylidene-2-norbornene copolymer of 58/42 ethylene/propylene ratio, 20 iodine number and 45 ML-4 at 257° F. which has been ground to a Tyler mesh particle size 3, and a mixture of 75 parts by weight of styrene, 40 parts by weight of acrylonitrile, 3 parts by weight of Lupersol-11 (trademark; 75% t-butylperoxy pivalate in mineral spirits) as a polymerization initiator, and 1.0 part of antioxidant, e.g., octadecyl-3,5-di-tert-butyl-4-hydroxyhydrocinnamate.

The reaction mixture is heated to 80° F. for 1½ hour and then to 240° F. and kept at this temperature for another 1½ hours at which time the reaction mixture is cooled to room temperature and the graft copolymer recovered by filtering and drying overnight in an oven at 66° C.

To make the AES, 46 parts of graft copolymer, 54 parts of SAN resin (Tyril 880B (trademark, from Dow Chemical), and 0.75 parts each of Tinuvin P (trademark) and Tinuvin 770 (trademark) (UV stabilizers from Ciba-Geigy) and 4 parts of titanium dioxide pigment (UNITANE OR-450; trademark) are fluxed at 165° C. for 10 minutes at 90 rpm in a Rheocord (trademark) Type M Torque Rheometer made by Haake, Inc. and equipped with cam rotors.

The expandable ABS core stock may be prepared according to the following recipe:

| Ingredients: | Parts |
| --- | --- |
| ABS (graft copolymer of styrene and acrylonitrile [70:30 ratio] on polybutadiene rubber [50:50 rubber-resin ratio]) | 68 |
| Styrene-acrylonitrile resin (70% styrene, 30% acrylonitrile) | 29 |
| Polyvinyl chloride resin | 3 |
| Diphenyl phthalate (processing aid and solid plasticizer) | 5 |
| Azodicarbonamide (Celogen AZ) | 2 |
| Zinc Oxide (activator) | 1.5 |

The solid ABS substrate stock may be prepared according to the following recipe:

| Ingredients: | Parts |
| --- | --- |
| Styrene-acrylonitrile resin (30% styrene) | 34 |
| ABS (as above) | 51 |
| Polyvinyl chloride resin | 15 |
| Epoxidized soybean oil (plasticizer) | 2 |
| Barium-cadmium laurate | .3 |

A typical unexpanded laminate consists of a core section of approximately 0.10 inch thick (assembled by any suitable conventional method, such as by calendering a sheet of this thickness, or by superimposing any required number of calendered sheets to give this thickness), a sub-strate sheet on both sides of the core 0.05 inch thick, and outer surface skins of the AES stock (exposed to outdoor aging), on both surfaces, which are 0.025 inch thick. The resulting laminate of superimposed layers is subjected to heat and pressure to cause adhesion of the various layers to each other, thereby forming an integral laminate. The heating is carried out for a time and temperature sufficient to bond together the plies and sufficient to decompose the blowing agent in the core. Heating temperatures of about 300° F. for a period of about 30 minutes at a pressure of about 65 pounds per square inch gives satisfactory results. This laminating step may be carried out in a conventional vulcanizer, or it can be carried out in a hydraulic press. The vulcanizer or press laminating step is carried out at temperatures which will decompose the blowing agent. However, unless the mechanics of the composition and laminating conditions are such that the internal pressure developed exceeds the external pressure, there is very little likelihood that any appreciable expansion of the core stock will take place. The laminate is thereafter heated in an unconfined state to effect the free expansion of the core stock. In typical practice of the invention, the heating step to effect expansion is an integral part of heating the laminate in order to soften it sufficiently to vacuum form it over any suitable form. The process of U.S. Pat. No. 3,070,817 as outlined in column 4, beginning at line 68, and in column 5, down through line 5, is typical of the procedure. After suitable heating to 285°–300° F., the laminate is molded about a form by the use of vacuum (or above atmospheric pressure) as desired.

In the composition described above, the core stock, initially 0.1 inch (unexpanded), will expand to approximately 0.4 inch, although it will be obvious that in any final formed part, because of the deformation of the sheet, this thickness will exceed that of the thickness of the core in the final formed part.

The final laminate, protected by the described skin, is remarkable for its resistance to degradation on outdoor aging. The surface is relatively hard and not easily marred, and it does not readily pick up dirt. The surface readily lends itself to decoration with high gloss enamels and lacquers, and it is further particularly advantageous from the standpoint of ease of handling and processing in the factory.

The advantages of these laminates over those of the prior art include improved weather ability and the ability to provide a range of surface hardness. Of even greater significance is the economic advantage of re-processibility (due to the compatibility of the skin with the substrate plus the inherent heat stability of EPDM).

Considering rejected parts, trim from vacuum forming, etc. scrap often exceeds 50%, and therefore it is of great importance to be able to recycle or reprocess the scrap.

What is claimed is:

1. A laminate having at least two layers, one of which comprises an uncured flexible skin layer of AES graft copolymer composition of resin-forming monomeric material on an ethylene-propylene-non-conjugated diene terpolymer rubber spine, and the other layer being a rigid foamed plastic compatible with AES, whereby the laminate is reprocessible.

2. A laminate as in claim 1 in which the said foamed layer comprises ABS graft copolymer of resin forming monomers on a polybutadiene rubber spine, the amount of resin being from 51 to 90 parts and the amount of rubber being correspondingly from 49 to 10 parts, by weight.

3. A laminate as in claim 1 in which the said foamed layer comprises AES graft copolymer composition of resin-forming monomeric material on an ethylene-propylene-non-conjugated diene terpolymer rubber spine.

4. A laminate as in claim 1 in which the said foamed layer comprises PVC resin.

5. A laminate comprising outer uncured flexible layers of solid AES graft copolymer composition on each face, and an inner core comprising a rigid foamed plastic layer compatible with AES, whereby the laminate is reprocessible, the said AES being a graft copolymer composition of resin-forming monomeric material on an ethylene-propylene-non-conjugated diene terpolymer rubber spine, the amount of rubber in said AES composition being from 10 to 50% by weight.

6. A laminate as in claim 5 in which the foamed layer comprises ABS graft copolymer of resin forming monomers on a polybutadiene rubber spine, the amount of resin being from 51 to 90 parts and the amount of rubber being correspondingly from 49 to 10 parts, by weight.

7. A laminate as in claims 1 or 6, in which there is an intermediate layer of solid ABS between the outer AES layer(s) and the inner plastic layer, the said intermediate solid ABS layer comprising a graft copolymer of resin forming monomers on a polybutadiene rubber spine, the amount of resin being from 51 to 90 parts and the amount of rubber being correspondingly from 49 to 10 parts, by weight.

8. In a five-layered, rigid, heat-formable, reprocessible, laminated sheet material having a core sheet of rigid cellular acrylonitrile-butadiene-styrene material, a rigid sheet of solid acrylonitrile-butadiene-styrene material integrally united to each face of said core sheet, and an outer protective skin of flexible adherent material overlying each outer face of the laminate, the improvement wherein the said outer protective skin is an uncured AES graft copolymer composition, the said AES comprising a graft copolymer of resin-forming material on ethylene-propylene non-conjugated diene rubber, having a rubber content of from 10% to 50% by weight, and the said acrylonitrile-butadiene-styrene material comprising a graft copolymer of styrene and acrylonitrile resin on polybutadiene rubber, the amount of resin being from 51 to 90 parts and the amount of rubber being correspondingly from 49 to 10 parts, by weight.

9. A laminated sheet as in claim 8 in which the resin-forming material in the AES graft copolymer is styrene-acrylonitrile.

10. A laminated sheet as in claim 9 in which the rubber content of the AES composition is about 23% by weight.

* * * * *